(12) United States Patent
Song et al.

(10) Patent No.: US 12,145,270 B2
(45) Date of Patent: Nov. 19, 2024

(54) AUTONOMOUS MOBILE GRABBING METHOD FOR MECHANICAL ARM BASED ON VISUAL-HAPTIC FUSION UNDER COMPLEX ILLUMINATION CONDITION

(71) Applicant: SOUTHEAST UNIVERSITY, Nanjing (CN)

(72) Inventors: Aiguo Song, Nanjing (CN); Linhu Wei, Nanjing (CN); Chaolong Qin, Nanjing (CN); Yu Zhao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 397 days.

(21) Appl. No.: 17/784,905

(22) PCT Filed: Oct. 26, 2021

(86) PCT No.: PCT/CN2021/126401
§ 371 (c)(1),
(2) Date: Jun. 13, 2022

(87) PCT Pub. No.: WO2023/056670
PCT Pub. Date: Apr. 13, 2023

(65) Prior Publication Data
US 2023/0042756 A1  Feb. 9, 2023

(30) Foreign Application Priority Data
Oct. 9, 2021 (CN) .......................... 202111177462.7

(51) Int. Cl.
*B25J 9/16* (2006.01)
*B25J 13/02* (2006.01)
(Continued)

(52) U.S. Cl.
CPC .......... *B25J 9/1612* (2013.01); *B25J 9/1633* (2013.01); *B25J 9/1653* (2013.01); *B25J 13/025* (2013.01);
(Continued)

(58) Field of Classification Search
CPC ...... B25J 9/1612; B25J 9/1633; B25J 9/1653; B25J 13/025; B25J 13/082; B25J 13/085;
(Continued)

(56) References Cited

U.S. PATENT DOCUMENTS 11,148,295 B2 * 10/2021 Correll ................ B25J 15/0266
2019/0176326 A1 * 6/2019 Bingham ............... B25J 9/1612
(Continued)

FOREIGN PATENT DOCUMENTS

| CN | 108171748 A | 6/2018 |
| CN | 109483554 A | 3/2019 |

(Continued)

*Primary Examiner* — Masud Ahmed
(74) *Attorney, Agent, or Firm* — MUNCY, GEISSLER, OLDS & LOWE, P.C.

(57) ABSTRACT

The present disclosure discloses an autonomous mobile grabbing method for a mechanical arm based on visual-haptic fusion under a complex illumination condition, which mainly includes approaching control over a target position and feedback control over environment information.

According to the method, under the complex illumination condition, weighted fusion is conducted on visible light and depth images of a preselected region, identification and positioning of a target object are completed based on a deep neural network, and a mobile mechanical arm is driven to continuously approach the target object; in addition, the pose of the mechanical arm is adjusted according to contact force information of a sensor module, the external environment and the target object; and meanwhile, visual information and haptic information of the target object are fused, and the optimal grabbing pose and the appropriate grabbing force of the target object are selected.

(Continued)

By adopting the method, the object positioning precision and the grabbing accuracy are improved, the collision damage and instability of the mechanical arm are effectively prevented, and the harmful deformation of the grabbed object is reduced.

6 Claims, 6 Drawing Sheets

(51) Int. Cl.
  *B25J 13/08* (2006.01)
  *B25J 19/02* (2006.01)
  *G06V 10/25* (2022.01)
  *G06V 10/60* (2022.01)
  *G06V 10/82* (2022.01)

(52) U.S. Cl.
  CPC ........... *B25J 13/082* (2013.01); *B25J 13/085* (2013.01); *B25J 19/023* (2013.01); *G06V 10/25* (2022.01); *G06V 10/60* (2022.01); *G06V 10/82* (2022.01)

(58) Field of Classification Search
  CPC .......... B25J 19/023; B25J 5/007; B25J 9/161; G06V 10/25; G06V 10/60; G06V 10/82; G05B 2219/39271; G05B 2219/39531; G05B 2219/39532; G05B 2219/39543; G05B 2219/40553; G05B 2219/40571; G05B 2219/40575; G05B 2219/40577
  See application file for complete search history.

(56) References Cited

U.S. PATENT DOCUMENTS

| | | | |
|---|---|---|---|
| 2019/0176348 A1* | 6/2019 | Bingham | B25J 9/1612 |
| 2019/0337152 A1* | 11/2019 | Homberg | B25J 9/1697 |
| 2019/0381670 A1 | 12/2019 | Correll et al. | |
| 2021/0394367 A1* | 12/2021 | Correll | B25J 9/1664 |
| 2023/0182314 A1* | 6/2023 | Hoelscher | G06F 18/23 |
| | | | 700/259 |

FOREIGN PATENT DOCUMENTS

| | | |
|---|---|---|
| CN | 111085997 A | 5/2020 |
| CN | 111462154 A | 7/2020 |
| CN | 111515945 A | 8/2020 |

* cited by examiner

AUTONOMOUS MOBILE GRABBING METHOD FOR MECHANICAL ARM BASED ON VISUAL-HAPTIC FUSION UNDER COMPLEX ILLUMINATION CONDITION

TECHNICAL FIELD

The present disclosure belongs to the technical field of robot control, and in particular relates to an autonomous mobile grabbing method for a mechanical arm based on visual-haptic fusion under a complex illumination condition.

BACKGROUND

In recent years, with the rapid development of sensor technology, navigation technology and deep learning technology, robot technology has also made great progress. Among them, mobile mechanical arm technology is also gradually widely used in the fields of automatic inspection, agricultural picking, warehousing and sorting.

Mobile mechanical arm has the ability of autonomous navigation and autonomous operation. Compared with the traditional industrial mechanical arm, it has higher flexibility and mobility, and can replace human beings to complete certain tasks autonomously in a complex environment.

In the related technologies, the difficulty often lies in the identification and positioning of the target object; In recent years, deep learning has developed rapidly, and more and more network models with lightweight, strong robustness and excellent classification performance have emerged.

Generally, with sufficient training samples, it is easy to obtain a network structure that meets the operation requirements, but the performance will still be influenced by the environment of the use scene, especially the illumination condition.

In subsequent operations, the scene environment may change greatly, and more accurate target object positioning is required for further operations, for example, grabbing a target object, rotating a switch, opening and closing a knife switch, etc.

Therefore, how to accurately obtain the actual spatial position of the target object under a complex illumination condition for accurate operation is an urgent task to be solved.

In addition, common mobile grabbing solutions mainly use visual information, which lacks the effective use of environmental contact information. Different from visual information, haptic information is not influenced by illumination and other conditions. At the same time, haptic information is a supplement to vision and can reflect the interaction between the robot and the external environment. With the development of sensor technology, more and more precise haptic sensors and 6-dimensional force sensors have been widely used. Through the information of these sensors, the stiffness, shape and weight of the target object can be effectively determined. How to use this information to help the mechanical arm interact with the target object more friendly and compliantly is also a challenging task.

SUMMARY

In order to solve the above problems, the present disclosure discloses an autonomous mobile grabbing method for a mechanical arm based on visual-haptic fusion under a complex illumination condition, which solves the problem that the prior art cannot obtain the accurate 3-dimensional spatial position of a target object, thus realizing accurate operation. At the same time, a multi-sensor module is introduced to improve the external environment sensing ability and friendly operation ability of the mechanical arm.

In order to achieve the above objectives, the present disclosure adopts the following technical solution:

An autonomous mobile grabbing method for a mechanical arm based on visual-haptic fusion under a complex illumination condition is provided. A system used thereby includes a communication module, an image acquisition module, a mobile grabbing module and a force sensing module.

Further, the communication module includes an upper computer system mounted on a remote console and an industrial computer system mounted on a mobile platform. The two systems are connected through WiFi and adopt SSH communication protocols. The upper computer sends control instructions to the industrial computer. The industrial computer transmits the acquired image and depth information, as well as the pose information of the mobile platform and the mechanical arm to the upper computer.

Further, the image acquisition module includes: a depth camera mounted on the mobile platform and configured to acquire the global depth and color information of a scene; a depth camera mounted at an end of the mechanical arm and configured to acquire the local depth and color information of the scene. The two cameras both transmit data to the industrial computer through USB 3 0 interfaces.

Further, the mobile grabbing module includes: a mobile platform, a 7-DOF mechanical arm and a controller thereof. The mobile platform is equipped with laser radar, an ultrasonic module and an infrared sensor. The laser radar is configured to perform environmental mapping. The ultrasonic module is configured to avoid obstacles in a navigation process. The infrared sensor is configured to prevent falling in the navigation process. The controller of the mechanical arm receives target pose and obstacle information, performs inverse kinematic solution, plans a movement path of the mechanical arm, and performs a grabbing task.

Further, the force sensing module includes: a 6-dimensional force sensor mounted between the end of the mechanical arm and a clamping hand and configured to measure the contact force between the mechanical arm and the environment, and adjust end positions of the mechanical arm and the environment through error calculation and correction to prevent damage caused by excessive contact force between an end actuator and the environment or body instability of the mechanical arm; 24-dimensional capacitive haptic sensor arrays mounted at fingertips of three fingers of the clamping hand and configured to feed back the change information of a pressure value of the hand to the industrial computer in real time to identify the softness and hardness of the object, so as to control the grabbing force of the mechanical hand, which can effectively reduce the harmful deformation of the grabbed object and prevent the finger motor of the mechanical hand from being overloaded.

Further, the method provided by the present disclosure includes the following steps:

step S1: under the complex illumination condition, introducing depth information which is less influenced by illumination change, identifying an approximate position of a target object in combination with visible light information, and sending a control instruction;

step S2: after a mobile platform receives the instruction, converting a coordinate system of the object into a coordinate system of the mobile platform, and navigating the mobile platform to a position near the target object;

step S3: starting a depth camera on the mobile platform again to obtain pose information of the target object, converting coordinates of the object into a base coordinate system of the mechanical arm, and controlling the mechanical arm to move to a position near the target object;

step S4: starting a depth camera at an end of the mechanical arm to obtain pose information of the target object, converting coordinates of the object into a base coordinate system of the mechanical arm, and controlling the mechanical arm to move to a target point;

step S5: adjusting the pose of the mechanical arm according to contact force information between a 6-dimensional force sensor at the end of the mechanical arm and an external environment;

step S6: acquiring haptic information by using sensors at fingertips of a mechanical hand, fusing the haptic information and the visual information to select the optimal grabbing pose of the target object, and determining the optimal grabbing force;

step S7: completing the precise grabbing of the target object according to the determined grabbing pose and grabbing force.

Further, in the steps S1, S2, S3 and S4, obtaining the pose information of the target object includes the following steps:

(a) subjecting obtained depth frames to decimation filtering, spatial filtering, temporal filtering and hole filling filtering sequentially to improve depth data quality and reduce noise level, where the obtained depth frames are obtained according to the principle of infrared stereo and the influence of illumination is capable of being effectively reduced;

(b) aligning a depth image $I_{Depth}$ obtained by the depth camera with a color image $I_{RGB}$;

(c) using a lightweight neural network to obtain a category and Region Of Interest ROI of a preselected object;

(d) extracting depth information features of the ROI of the depth image $I_{Depth}$ to obtain a depth saliency map $D_S$;

(e) extracting brightness and texture features of the visible light image $I_{Visual}$ to obtain a visible light saliency map $V_S$;

(f) weighting $D_S$ and $V_S$ to obtain a fused saliency map to highlight a target region and weakening the influence of illumination;

$$F_i(x, y) = \frac{S_i^{(V)}}{S_i^{(V)} + S_i^{(D)}} V_{S_i}(x, y) + (1 - \frac{S_i^{(V)}}{S_i^{(V)} + S_i^{(D)}})D_{S_i}(x, y)$$

wherein $S_i^{(V)}$ is region saliency based on brightness in a corresponding region of the visible light image, and $S_i^{(D)}$ is region saliency based on brightness in a corresponding region of the depth image;

(g) precisely segmenting and positioning the target object again according to the obtained saliency map to obtain image centroid coordinates;

(h) converting the obtained 2-dimensional centroid coordinates into actual 3-dimensional spatial coordinates, where a conversion formula is as follows:

$$X = \frac{\overline{Z}(C_x - ppx)}{f_x}$$

$$Y = \frac{\overline{Z}(C_y - ppy)}{f_y}$$

$$\overline{Z} = \frac{1}{4h^2} \sum_{x-h<i<x+h} \sum_{y-h<i<y+h} Z_{ij}$$

$f_x$ and $f_y$ represent the focal distance of the image, ppx and ppy are coordinates of a projection center, (X, Y, $\overline{Z}$) is 3-dimensional coordinates of the target point, and $C_x$ and $C_y$ are horizontal and vertical coordinates of a centroid.

Further, in the step S5, the 6-dimensional force sensor is used to measure the contact force between the mechanical arm and the environment, and an end position of the mechanical arm is adjusted through error calculation and correction to prevent damage or body instability of the mechanical arm caused by excessive contact force between an end actuator and the environment.

Further, in the step S6, three 24-dimensional capacitive sensor arrays are used to acquire the haptic information, the haptic information and the visual information are fused to determine the optimal grabbing point and grabbing force of the object, and the step includes:

step S61: selecting the optimal grabbing pose based on visual-haptic point cloud fusion;

step S62: determining object stiffness and grabbing force based on visual texture and force haptics.

Further, in the step S61, selecting the optimal grabbing pose based on visual-haptic point cloud fusion includes:

step S611: performing, by the mechanical hand, touch sensing to the object according to a predetermined exploration program;

step S612: when the reading of a sensor unit exceeds a set threshold, determining that the mechanical hand is in contact with the object, and recording relevant data, including contact unit position coordinates p(x, y, z), normal vector n=($n_x$, $n_y$, $n_z$), mechanical arm joint sensor reading $\theta_{arm}=\{\theta_1, \ldots \theta_7\}$ and mechanical hand joint $f_i$ sensor reading $\theta_{hand}^{fi}=\{\theta_1^{fi}, \theta_2^{fi}, \theta_3^{fi}\}$;

step S613: converting the relevant data into a base coordinate system of a robot to obtain the information $P_j=[loc_j, N_j]$ of a certain contact point:

$loc=T_{arm}(\theta_{arm})T_{hand}(\theta_{hand}^{fi})p$ $N=T_{arm}(\theta_{arm})T_{hand}(\theta_{hand}^{fi})n$ where $T_{arm}$ is a transformation matrix from the end of the mechanical arm to the base coordinate system, $T_{hand}$ is a transformation matrix from the mechanical hand to the end coordinate system of the mechanical arm;

step S614: after a complete exploration program, obtaining j contact point data and generating a point cloud set $PC_{haptic}=\{P_1, \ldots P_j\}$ of the object;

step S615: acquiring visual point cloud, segmenting the target point cloud by adopting pass-through filtering and a Random Sample Consensus RANSAC algorithm, removing outlier noise points by adopting a statistical filtering SOR, smoothing the point cloud by adopting a Moving Least Square MLS method, and finally obtaining the visual point cloud $PC_{visual}$ of the target object;

step S616: registering the visual contact cloud by adopting an IOP algorithm;

step S617: inputting the registered point cloud information into a trained 3D convolutional neural network to obtain the optimal grabbing pose G=((x, y, z), w, θ) of the target object;

where (x, y, z) is the 3-dimensional coordinates of the optimal grabbing point, w is the pre-grabbing opening and closing width of the mechanical hand, and θ the deflection angle with Z axis.

Further, in the step S62, determining object stiffness and grabbing force based on visual texture and force haptics includes:

step S621: grabbing, by the mechanical hand, the object according to the grabbing pose determined in step S61, and acquiring, by haptic sensors, data S={$n_1$, $n_2$, ... $n_{72}$};

step S622: acquiring, by a camera at the end, the visual texture information of the target object;

step S623: building a multimodal fusion network: performing feature extraction to the haptic information and the visual texture information respectively by using CNN, then fusing the extracted features, and building a classification network on this basis to evaluate the stiffness class R of the target object;

step S624: determining a grabbing force threshold according to the object stiffness, and controlling the mechanical hand by adopting a PD method, where the specific method is as follows:

$$\theta = K_p(F_g - F) + K_d\left(\frac{dF}{dt}\right)$$

$$F_g = [F_{g1}, F_{g2}, \ldots F_{gm}]$$

where θ is a rotation angle increment of a finger motor of the mechanical hand, $K_p$ and $K_d$ are respectively a proportional parameter and a differential parameter, and $F_g$ is the grabbing force threshold, which is determined by the stiffness class R, where by controlling the grabbing force of the mechanical hand, the harmful deformation of the grabbed object can be effectively reduced and the finger motor of the mechanical hand is prevented from being overloaded.

The beneficial effects of the present disclosure are as follows.

1) The present disclosure identifies the category of the target object based on the lightweight neural network, preliminarily selects the region where the target is located, obtains the target saliency map by weighting the depth of the selected region and the visible light information, further identifies and obtains a more accurate target object boundary, so as to determine the object centroid. After multiple depth frame filtering, the depth information data quality is improved and the noise level is reduced, and finally the object positioning accuracy and grabbing accuracy are improved.

2) The present disclosure measures the contact force between the mechanical arm and the external environment based on the sensor module, and can correct and adjust the end position of the mechanical arm to prevent damage or body instability of the mechanical arm caused by excessive contact force between the end actuator and the environment. In addition, by measuring through the haptic sensor arrays of the mechanical hand, fusing the haptic information and the visual information, and selecting the optimal grabbing pose and grabbing force, the harmful deformation of the grabbed object can be effectively reduced and the finger motor of the mechanical hand can be prevented from being overloaded.

DETAILED DESCRIPTION

The present disclosure is described further below with reference to drawings and specific implementations. It should be understood that these specific implementations are merely intended to illustrate the present disclosure and are not intended to limit the scope of the present disclosure.

Figure 1:
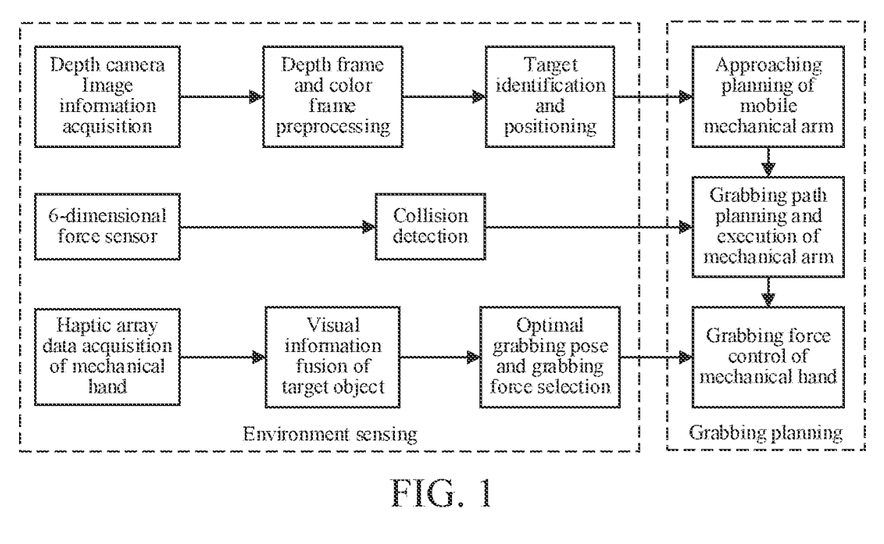
FIG. 1 illustrates a schematic diagram of main links according to an embodiment of the present disclosure.

An embodiment of the present disclosure provides an autonomous mobile grabbing method for a mechanical arm based on visual-haptic fusion under a complex illumination condition. An overall diagram of a system is as illustrated in FIG. 1. The system includes a communication module, an image acquisition module, a mobile grabbing module and a force sensing module.

The communication module is configured to transmit control instructions, images and pose information, includes an upper computer system mounted on a remote console and an industrial computer system mounted on a mobile platform. The two systems are connected through WiFi and adopt SSH communication protocols.

The upper computer sends the control instructions to the industrial computer. The industrial computer transmits the acquired image and depth information, as well as the pose information of the mobile platform and a mechanical arm to the upper computer.

The upper computer system is Windows10, and has a visual graphical interface to display image information acquired by a depth camera and the pose information of the mobile mechanical arm.

The industrial computer system is Ubuntu16.04. Combined with the ROS framework, it can be further developed, and is connected to a lower motion device controller, a peripheral sensing device and an extension execution component. At the same time, it provides an interface function for each sensor and the extension execution component to facilitate the programming of the mobile platform.

In addition, the industrial computer is equipped with wired and wireless network cards and Bluetooth devices, which can be connected to the external network, communicate with external devices or realize remote control.

The image acquisition module is configured to acquire the depth and color information of a scene, and includes a depth camera mounted on the mobile platform and a depth camera mounted at an end of the mechanical arm.

Both cameras are Realsense D435 and data are transmitted to the industrial computer through usb3.0 interfaces.

The mobile grasping module is configured to approach and grab the target object, and includes a mobile platform, a 7-DOF mechanical arm and a controller thereof.

The mobile platform is equipped with laser radar, an ultrasonic module and an infrared sensor. The laser radar is configured to perform environmental mapping. The ultrasonic module is configured to avoid obstacles in a navigation process. The infrared sensor is configured to prevent falling in the navigation process. The controller of the mechanical arm receives target pose and obstacle information, performs inverse kinematic solution, plans a movement path of the mechanical arm, and performs a grabbing task.

The force sensing module is configured to sense the information of the external environment and the target object, and includes a 6-dimensional force sensor and 24-dimensional haptic sensor arrays.

The 6-dimensional force sensor is mounted between the end of the mechanical arm and a clamping hand and configured to measure the contact force between the mechanical arm and the environment, and adjust end positions of the mechanical arm and the environment through error calculation and correction to prevent damage caused by excessive contact force between an end actuator and the environment or body instability of the mechanical arm. The 24-dimensional capacitive haptic sensor arrays are mounted at fingertips of three fingers of the clamping hand and configured to feed back the change information of a pressure value of the hand to the industrial computer in real time to identify the softness and hardness of the object, so as to control the grabbing force of the mechanical hand, which can effectively reduce the harmful deformation of the grabbed object and prevent the finger motor of the mechanical hand from being overloaded.

Figure 2:
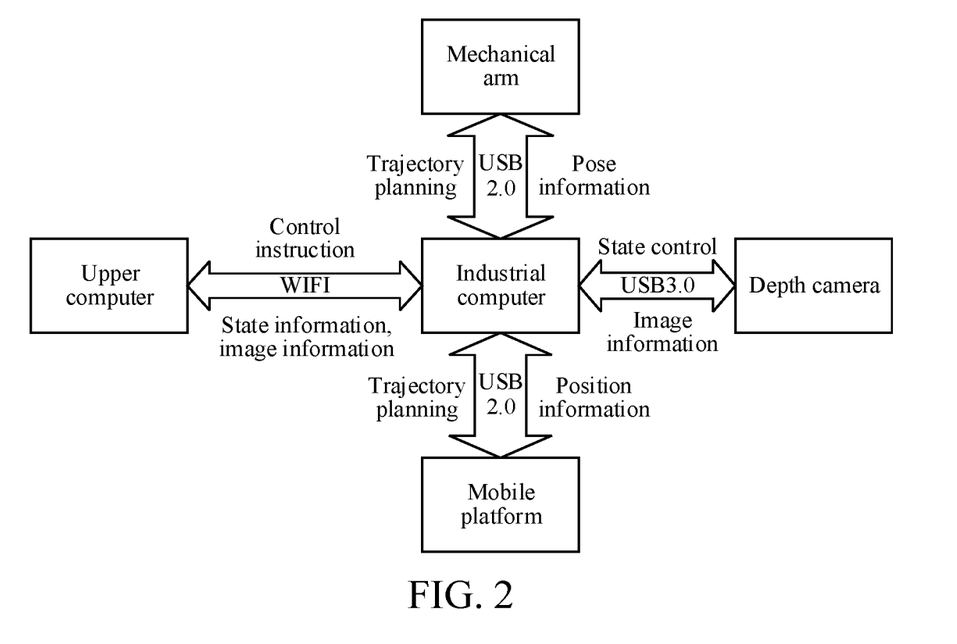
FIG. 2 illustrates a structural diagram of a system according to an embodiment of the present disclosure.

In this embodiment of the present disclosure, a processing process is mainly divided into two links, as illustrated in FIG. 2, including an environment sensing link and a grabbing planning link.

The environment sensing link includes object identification and positioning, collision detection, and object softness and hardness identification.

In this link, the image acquisition module acquires the depth and color information of the scene, completes the determination of the category of the target object and the selection of an initial effective region through a depth neural network, finally, in combination with the depth data, further selects an effective region and calculates the three-dimensional coordinates of the target. Collision detection is mainly to detect the contact between the mechanical arm and the environment through the 6-dimensional force sensor in the force sensing module, and adjust the pose of the mechanical arm to prevent the excessive collision between the mechanical arm and a scene obstacle from causing damage or instability to the body. Object softness and hardness identification is mainly to sense the contact information between the mechanical hand and the target object through the haptic sensor arrays in the force sensing module, and fuse the contact information and the visual texture information, so as to determine the softness and hardness of the object and adjust the control parameters of the mechanical hand.

The grabbing planning link includes path planning, position adjustment, kinematics solution and motor control.

In this link, the position of the mobile mechanical arm is continuously adjusted according to the position of the target object to make the mechanical hand approach the target object, and effective kinematic solution and path planning are carried out to prevent the collision of the mobile mechanical arm. In addition, the visual information and the haptic information are fused, and the optimal grabbing pose and appropriate grabbing force of the object are selected to reduce the harmful deformation of the grabbed object.

Figure 3:
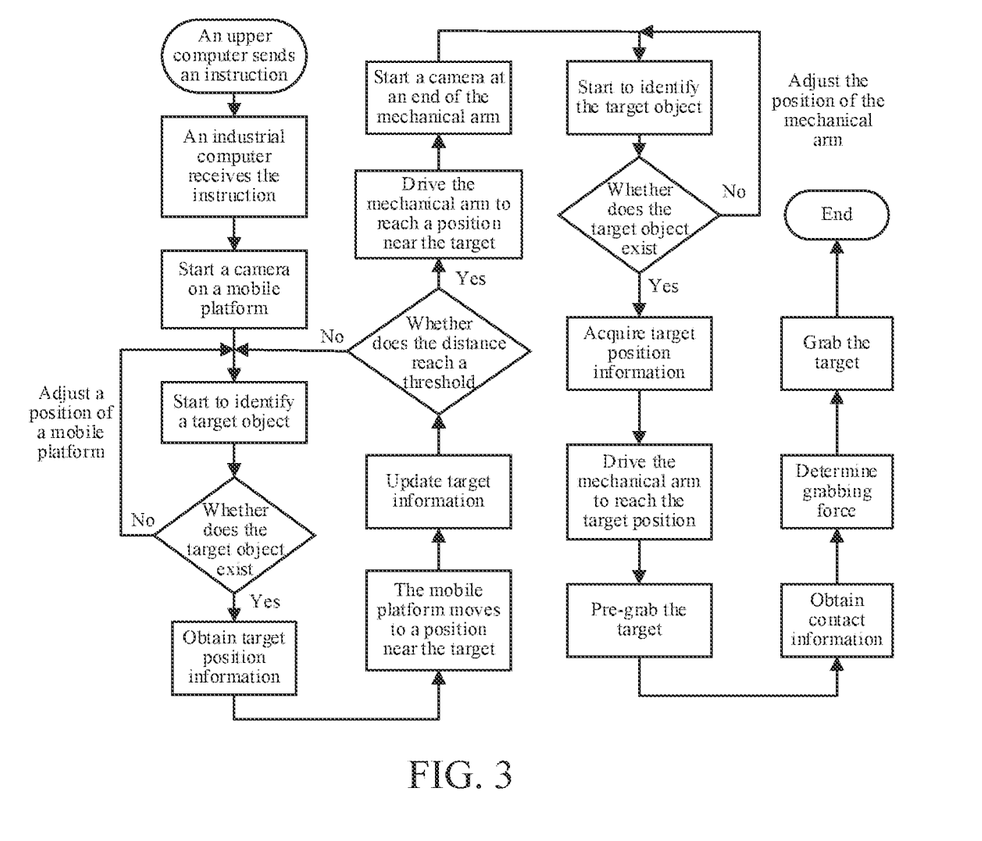
FIG. 3 illustrates a flowchart of a method according to an embodiment of the present disclosure.

Further, a main flowchart according to this embodiment of the present disclosure is as illustrated in FIG. 3. The steps according to the embodiment will be described below in detail with reference to FIG. 3.

Step S1, under the complex illumination condition, depth information which is less influenced by illumination change is introduced, an approximate position of a target object is identified in combination with visible light information, and a control instruction is sent.

Figure 4:
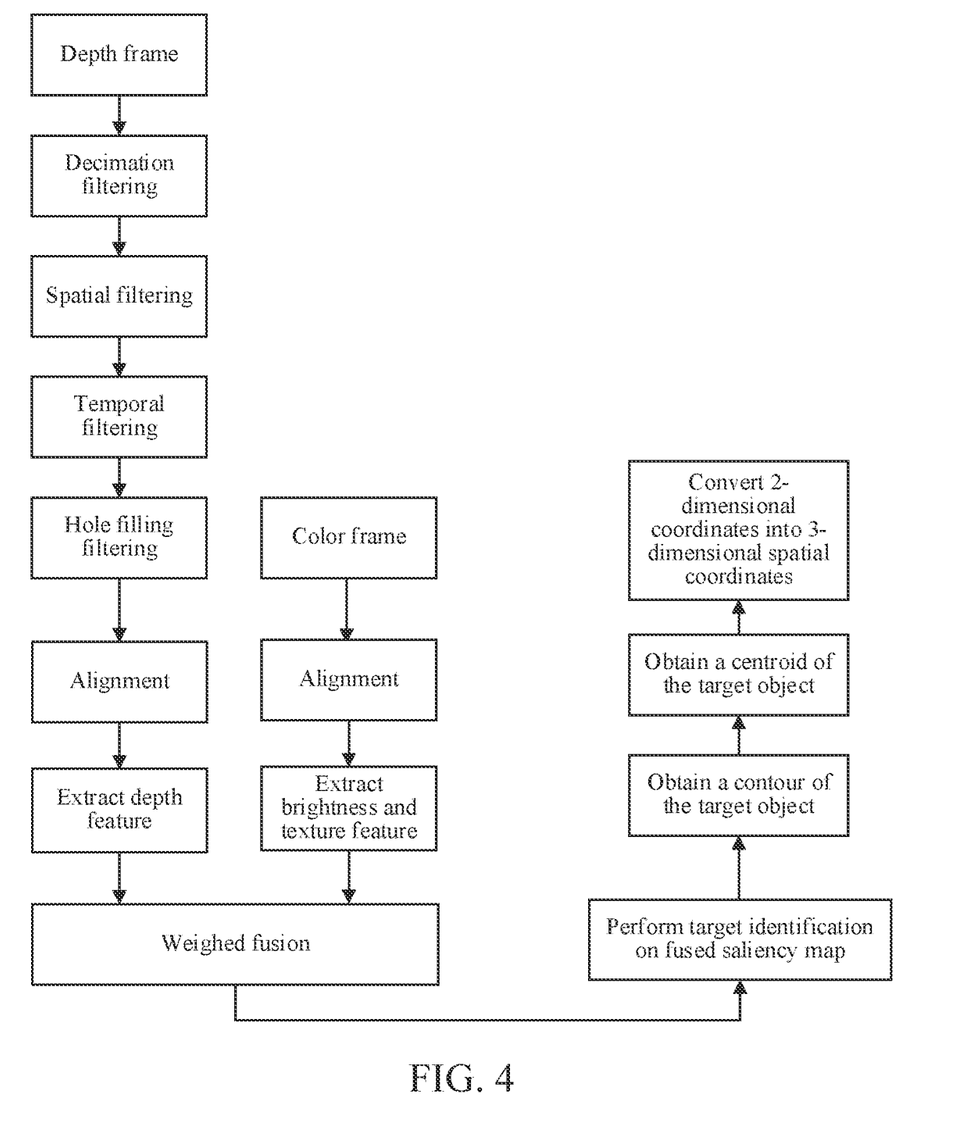
FIG. 4 illustrates a flowchart of object identification and positioning according to an embodiment of the present disclosure.

Further, a flowchart of object identification and positioning is as illustrated in FIG. 4. The step S1 will be described below in detail with reference to FIG. 4.

Step S11, a depth camera on a mobile platform is started to acquire images.

Step S12, obtained depth frames are subjected to decimation filtering, spatial filtering, temporal filtering and hole filling filtering sequentially to improve depth data quality and reduce noise level. The obtained depth frames are obtained according to the principle of infrared stereo and the influence of illumination is capable of being effectively reduced.

Step S13, a depth image $I_{Depth}$ obtained by the depth camera is aligned with a color image $I_{RGB}$.

Step S14, a lightweight neural network is used to obtain a category and Region Of Interest ROI of a preselected object.

Step S15, depth information features of the ROI of the depth image $I_{Depth}$ are extracted to obtain a depth saliency map $D_S$.

Step S16, brightness and texture features of the visible light image $I_{Visual}$ are extracted to obtain a visible light saliency map $V_S$.

Step S17, $D_S$ and $V_S$ are weighed to obtain a fused saliency map to highlight a target region and weakening the influence of illumination:

$$F_i(x, y) = \frac{S_i^{(V)}}{S_i^{(V)} + S_i^{(D)}} V_{S_i}(x, y) + (1 - \frac{S_i^{(V)}}{S_i^{(V)} + S_i^{(D)}}) D_{S_i}(x, y)$$

where $S_i^{(V)}$ is region saliency based on brightness in a corresponding region of the visible light image, and $S_i^{(D)}$ is region saliency based on brightness in a corresponding region of the depth image;

Step S18, the target object is precisely segmented and positioned again according to the obtained saliency map to obtain image centroid coordinates.

Step S19, the obtained 2-dimensional centroid coordinates are converted into actual 3-dimensional spatial coordinates, where a conversion formula is as follows:

$$X = \frac{Z(C_x - ppx)}{f_x}$$

$$Y = \frac{Z(C_y - ppy)}{f_y}$$

$$Z = \frac{1}{4h^2} \sum_{x-h<i<x+h} \sum_{y-h<i<y+h} Z_{ij}$$

$f_x$ and $f_y$ represent the focal distance of the image, ppx and ppy are coordinates of a projection center, (X, Y, Z) is 3-dimensional coordinates of the target point, and $C_x$ and $C_y$ are horizontal and vertical coordinates of a centroid.

Step S2, after a mobile platform receives the instruction, a coordinate system of the object is converted into a coordinate system of the mobile platform, and the mobile platform is navigated to a position near the target object.

Step S3, a depth camera on the mobile platform is started again to obtain pose information of the target object, coordinates of the object are converted into a base coordinate system of the mechanical arm, and the mechanical arm is controlled to move to a position near the target object. The steps of identifying and positioning the target object are the same as steps S12-S19.

Step S4, a depth camera at an end of the mechanical arm is started to obtain pose information of the target object, coordinates of the object are converted into a base coordinate system of the mechanical arm, and the mechanical arm is controlled to move to a target point. The steps of identifying and positioning the target object are the same as steps S12-S19.

Step S5, according to the contact force between the 6-dimensional force sensor at the end of the mechanical arm and the external environment, an end position of the mechanical arm is adjusted through error calculation and correction to prevent damage or body instability of the mechanical arm caused by excessive contact force between an end actuator and the environment.

Step S61, the clamping hand of the mechanical arm acquires haptic point cloud according to an exploration program, the haptic point cloud and the visual point cloud are fused, and the optimal grabbing pose of the target object is determined.

Figure 5:
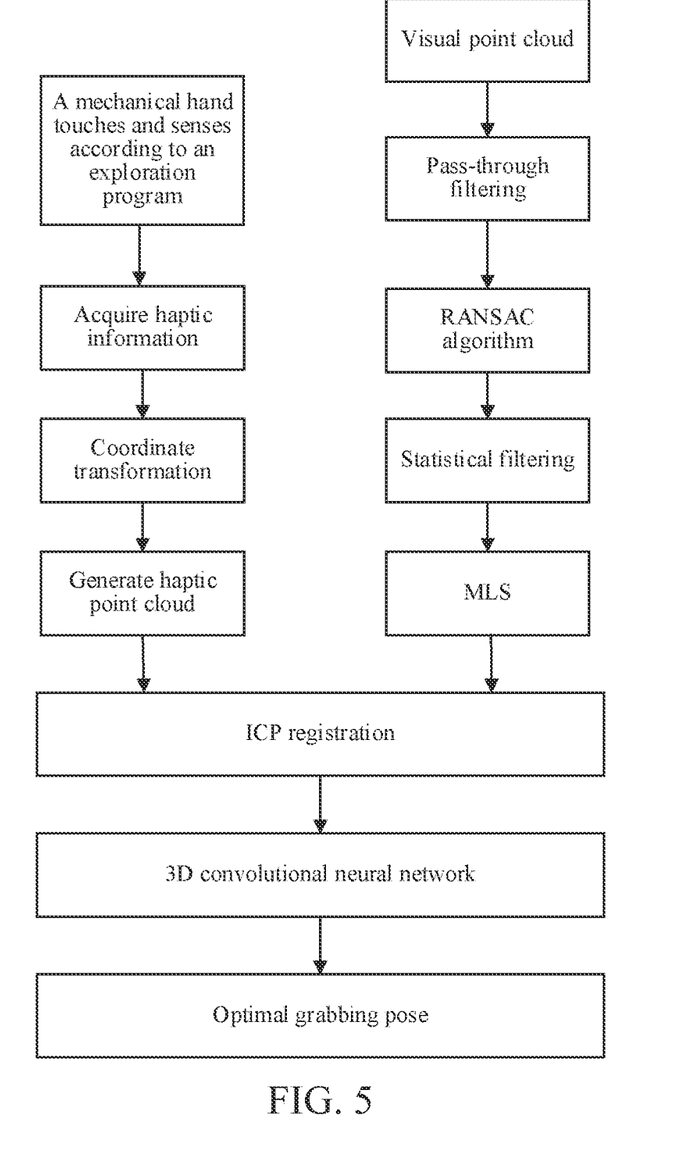
FIG. 5 illustrates a schematic diagram of optimal pose selection according to an embodiment of the present disclosure.

Further, a flowchart of optimal grabbing pose selection based on visual-haptic point cloud fusion is as illustrated in FIG. 5. The step S61 will be described below in detail with reference to FIG. 5.

Step S611, the mechanical hand performs touch sensing to the object according to a predetermined exploration program.

Step S612, when the reading of a sensor unit exceeds a set threshold, it is determined that the mechanical hand is in contact with the object, and relevant data, including contact unit position coordinates p(x, y, z), normal vector n=($n_x$, $n_y$, $n_z$), mechanical arm joint sensor reading $\theta_{arm}$={$\theta_a$, ... $\theta_7$} and mechanical hand joint f sensor reading $\theta_{hand}^{fi}$={$\theta_1^{fi}$, $\theta_2^{fi}$, $\theta_3^{fi}$} are recorded.

Step S613, the relevant data are converted into a base coordinate system of a robot to obtain the information $P_j$=[$loc_j$, $N_j$] of a certain contact point:

$$loc = T_{arm}(\theta_{arm}) T_{hand}(\theta_{hand}^{fi}) p$$

$$N = T_{arm}(\theta_{arm}) T_{hand}(\theta_{hand}^{fi}) n$$

where $T_{arm}$ is a transformation matrix from the end of the mechanical arm to the base coordinate system, $T_{hand}$ is a transformation matrix from the mechanical hand to the end coordinate system of the mechanical arm.

Step S614, after a complete exploration program, j contact point data are obtained and a point cloud set $PC_{haptic}$={$P_1$, ... $P_j$} of the object is generated.

Step S615, visual point cloud is acquired, the target point cloud is segmented by adopting pass-through filtering and a Random Sample Consensus RANSAC algorithm, outlier noise points are removed by adopting a statistical filtering SOR, the point cloud is smoothed by adopting a Moving Least Square MLS method, and finally the visual point cloud $PC_{visual}$ of the target object is obtained.

Step S616, the visual contact cloud is registered by adopting an IOP algorithm.

Step S617, the registered point cloud information is input into a trained 3D convolutional neural network to obtain the optimal grabbing pose G=((x, y, z), w, θ) of the target object, where (x, y, z) is the 3-dimensional coordinates of the optimal grabbing point, w is the pre-grabbing opening and closing width of the mechanical hand, and θ is the deflection angle with Z axis.

Step S62, the mechanical hand grabs the object, haptic information is acquired, the haptic information and visual texture information of the object are fused, and the stiffness of the target object is determined to control the grabbing force of the clamping hand.

Figure 6:
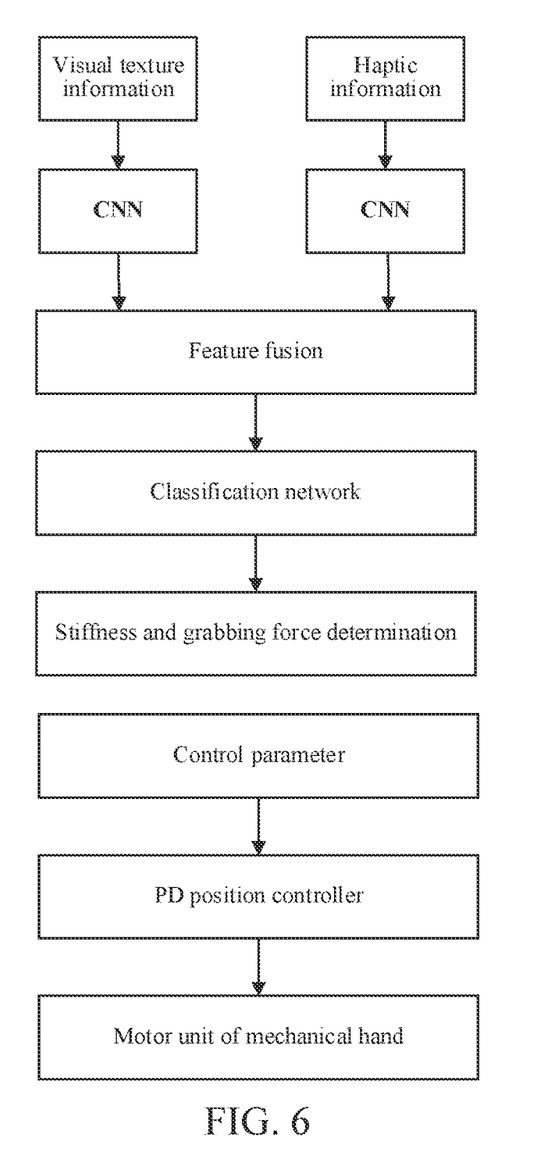
FIG. 6 illustrates a schematic diagram of object stiffness and grabbing force determination according to an embodiment of the present disclosure.

Further, a flowchart of optimal grabbing pose selection based on visual-haptic point cloud fusion is as illustrated in FIG. 6. The step S62 will be described below in detail with reference to FIG. 6.

Step S621, the mechanical hand grabs the object according to the grabbing pose determined in step S61, and haptic sensors acquire data S={$n_1$, $n_2$, ... $n_{72}$}.

Step S622, a camera at the end acquires the visual texture information of the target object.

Step S623, a multimodal fusion network is built: feature extraction is performed to the haptic information and the visual texture information respectively by using CNN, then the extracted features are fused, and a classification network is built on this basis to evaluate the stiffness class R of the target object.

Step S624, a grabbing force threshold is determined according to the object stiffness, and the mechanical hand is controlled by adopting a PD method, where the specific method is as follows:

$$\theta = K_p(F_g - F) + K_d\left(\frac{dF}{dt}\right)$$

$$F_g = [F_{g1}, F_{g2}, ... F_{gm}]$$

where θ is a rotation angle increment of a finger motor of the mechanical hand, $K_p$ and $K_d$ are respectively a proportional parameter and a differential parameter, and $F_g$ is the grabbing force threshold, which is determined by the stiffness class R.

By controlling the grabbing force of the mechanical hand, the harmful deformation of the grabbed object can be effectively reduced and the finger motor of the mechanical hand is prevented from being overloaded.

step S7: completing the precise grabbing of the target object according to the determined grabbing pose and grabbing force.

The present disclosure improves the depth information data quality and reduces the noise level after multiple depth frame filtering. At the same time, the present disclosure identifies the category of the target object based on the lightweight neural network, preliminarily selects the region where the target is located, and then fuses the visible light and depth information of the target region to obtain a more accurate target object boundary, so as to determine the object centroid and improve the object positioning accuracy. The present disclosure measures the contact force between the mechanical arm and the external environment based on the sensor module, and can correct and adjust the end position of the mechanical arm to prevent damage or body instability of the mechanical arm caused by excessive contact force between the end actuator and the environment. In addition, by fusing the haptic information and the visual information, and determining the optimal grabbing pose and grabbing force of the target object, the grabbing success rate can be effectively improved, the grabbing force of the mechanical hand can be controlled, the harmful deformation of the grabbed object can be effectively reduced and the finger motor of the mechanical hand can be prevented from being overloaded.

It should be noted that the foregoing content only illustrates the technical idea of the present disclosure, and is not intended to limit the protection scope of the present disclosure hereby. A person of ordinary skill in the art may make various improvements and modifications without departing from the principles of the present disclosure, and such improvements and modifications shall all fall within the protection scope of the claims of the present disclosure.

What is claimed is:

1. An autonomous mobile grabbing method for a mechanical arm based on visual-haptic fusion under a complex illumination condition, wherein under the complex illumination condition, visible light and depth information based on vision and haptic information of an object are fused to complete a process from fuzzy identification of the object to precise identification and grabbing, and the specific steps are as follows:
    step S1: under the complex illumination condition, introducing depth information which is less influenced by illumination change, identifying an approximate position of a target object in combination with visible light information, and sending a control instruction;
    step S2: after a mobile platform receives the instruction, converting a coordinate system of the object into a coordinate system of the mobile platform, and navigating the mobile platform to a position near the target object;
    step S3: starting a depth camera on the mobile platform again to obtain pose information of the target object, converting coordinates of the object into a base coordinate system of the mechanical arm, and controlling the mechanical arm to move to a position near the target object;
    step S4: starting a depth camera at an end of the mechanical arm to obtain pose information of the target object, converting coordinates of the object into a base coordinate system of the mechanical arm, and controlling the mechanical arm to move to a target point;
    step S5: adjusting the pose of the mechanical arm according to contact force information between a 6-dimensional force sensor at the end of the mechanical arm and an external environment;
    step S6: acquiring haptic information by using sensors at fingertips of a mechanical hand, fusing the haptic information and the visual information to select the optimal grabbing pose of the target object, and determining the optimal grabbing force; and
    step S7: completing the precise grabbing of the target object according to the determined grabbing pose and grabbing force.

2. The autonomous mobile grabbing method for the mechanical arm based on visual-haptic fusion under the complex illumination condition according to claim 1, wherein in the steps S1, S2, S3 and S4, obtaining the pose information of the target object comprises the following steps:
    (a) subjecting obtained depth frames to decimation filtering, spatial filtering, temporal filtering and hole filling filtering sequentially to improve depth data quality and reduce noise level, wherein the obtained depth frames are obtained according to the principle of infrared stereo and the influence of illumination is capable of being effectively reduced;
    (b) aligning a depth image $I_{Depth}$ obtained by the depth camera with a color image $I_{RGB}$;
    (c) using a lightweight neural network to obtain a category and Region Of Interest ROI of a preselected object;
    (d) extracting depth information features of the ROI of the depth image $I_{Depth}$ to obtain a depth saliency map $D_S$;
    (e) extracting brightness and texture features of the visible light image $I_{Visual}$ to obtain a visible light saliency map $V_S$;
    (f) weighting $D_S$ and $V_S$ to obtain a fused saliency map to highlight a target region and weakening the influence of illumination:

$$\text{wherein } F_i(x, y) = \frac{S_i^{(V)}}{S_i^{(V)} + S_i^{(D)}} V_{S_i}(x, y) + (1 - \frac{S_i^{(V)}}{S_i^{(V)} + S_i^{(D)}}) D_{S_i}(x, y)$$

$S_i^{(V)}$ is region saliency based on brightness in a corresponding region of the visible light image, and $S_i^{(D)}$ is region saliency based on brightness in a corresponding region of the depth image;
    (g) precisely segmenting and positioning the target object again according to the obtained saliency map to obtain image centroid coordinates;
    (h) converting the obtained 2-dimensional centroid coordinates into actual 3-dimensional spatial coordinates, wherein a conversion formula is as follows:

$$X = \frac{\overline{Z}(C_x - ppx)}{f_x}$$
    $$Y = \frac{\overline{Z}(C_y - ppy)}{f_y}$$
    $$Z = \frac{1}{4h^2} \sum_{x-h<i<x+h} \sum_{y-h<i<y+h} Z_{ij}$$

$f_x$ and $f_y$ represent the focal distance of the image, ppx and ppy are coordinates of a projection center, (X, Y, Z) is 3-dimensional coordinates of the target point, and $C_x$ and $C_y$ are horizontal and vertical coordinates of a centroid.

3. The autonomous mobile grabbing method for the mechanical arm based on visual-haptic fusion under the complex illumination condition according to claim 1, wherein in the step S5, the 6-dimensional force sensor is used to measure the contact force between the mechanical arm and the environment, and an end position of the mechanical arm is adjusted through error calculation and correction to prevent damage or body instability of the mechanical arm caused by excessive contact force between an end actuator and the environment.

4. The autonomous mobile grabbing method for the mechanical arm based on visual-haptic fusion under the complex illumination condition according to claim 1, wherein in the step S6, three 24-dimensional capacitive sensor arrays are used to acquire the haptic information, the haptic information and the visual information are fused to determine the optimal grabbing point and grabbing force of the object, and the step comprises:
    step S61: selecting the optimal grabbing pose based on visual-haptic point cloud fusion;
    step S62: determining object stiffness and grabbing force based on visual texture and force haptics.

5. The autonomous mobile grabbing method for the mechanical arm based on visual-haptic fusion under the complex illumination condition according to claim 4, wherein in the step S61, selecting the optimal grabbing pose based on visual-haptic point cloud fusion comprises:

step S611: performing, by the mechanical hand, touch sensing to the object according to a predetermined exploration program;

step S612: when the reading of a sensor unit exceeds a set threshold, determining that the mechanical hand is in contact with the object, and recording relevant data, comprising contact unit position coordinates p(x, y, z), normal vector n=($n_x$, $n_y$, $n_z$), mechanical arm joint sensor reading $\theta_{arm}=\{\theta_1, \ldots \theta_7\}$ and mechanical hand joint $f_i$ sensor reading $\theta_{hand}^{f_i}=\{\theta_1^{f_i}, \theta_2^{f_i}, \theta_3^{f_i}\}$;

step S613: converting the relevant data into a base coordinate system of a robot to obtain the information $P_j=[loc_j, N_j]$ of a certain contact point:

$$loc = T_{arm}(\theta_{arm}) T_{hand}(\theta_{hand}^{f_i}) p$$

$$N = T_{arm}(\theta_{arm}) T_{hand}(\theta_{hand}^{f_i}) n$$

wherein $T_{arm}$ is a transformation matrix from the end of the mechanical arm to the base coordinate system, $T_{hand}$ is a transformation matrix from the mechanical hand to the end coordinate system of the mechanical arm;

step S614: after a complete exploration program, obtaining j contact point data and generating a point cloud set $PC_{haptic}=\{P_1, \ldots P_j\}$ of the object;

step S615: acquiring visual point cloud, segmenting the target point cloud by adopting pass-through filtering and a Random Sample Consensus RANSAC algorithm, removing outlier noise points by adopting a statistical filtering SOR, smoothing the point cloud by adopting a Moving Least Square MLS method, and finally obtaining the visual point cloud $PC_{visual}$ of the target object;

step S616: registering the visual contact cloud by adopting an IOP algorithm;

step S617: inputting the registered point cloud information into a trained 3D convolutional neural network to obtain the optimal grabbing pose G=((x, y, z), w, θ) of the target object;

wherein (x, y, z) is the 3-dimensional coordinates of the optimal grabbing point, w is the pre-grabbing opening and closing width of the mechanical hand, and θ is the deflection angle with Z axis.

6. The autonomous mobile grabbing method for the mechanical arm based on visual-haptic fusion under the complex illumination condition according to claim 4, wherein in the step S62, determining object stiffness and grabbing force based on visual texture and force haptics comprises:

step S621: grabbing, by the mechanical hand, the object according to the grabbing pose determined in step S61, and acquiring, by haptic sensors, data S=$\{n_1, n_2, \ldots n_{72}\}$;

step S622: acquiring, by a camera at the end, the visual texture information of the target object;

step S623: building a multimodal fusion network: performing feature extraction to the haptic information and the visual texture information respectively by using CNN, then fusing the extracted features, and building a classification network on this basis to evaluate the stiffness class R of the target object;

step S624: determining a grabbing force threshold according to the object stiffness, and controlling the mechanical hand by adopting a PD method, wherein the specific method is as follows:

$$\theta = K_p(F_g - F) + K_d\left(\frac{dF}{dt}\right)$$

$$F_g = [F_{g1}, F_{g2}, \ldots F_{gm}]$$

wherein θ is a rotation angle increment of a finger motor of the mechanical hand, $K_p$ and $K_d$ are respectively a proportional parameter and a differential parameter, and $F_g$ is the grabbing force threshold, which is determined by the stiffness class R, wherein by controlling the grabbing force of the mechanical hand, the harmful deformation of the grabbed object is effectively reduced and the finger motor of the mechanical hand is prevented from being overloaded.

* * * * *